(12) United States Patent
Ke

(10) Patent No.: US 9,747,173 B2
(45) Date of Patent: Aug. 29, 2017

(54) DATA STORAGE DEVICES AND DATA MAINTENANCE METHODS

(71) Applicant: Silicon Motion, Inc., Jhubei, Hsinchu County (TW)

(72) Inventor: Kuan-Yu Ke, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 15/345,785

(22) Filed: Nov. 8, 2016

(65) Prior Publication Data

US 2017/0139784 A1    May 18, 2017

Related U.S. Application Data

(60) Provisional application No. 62/254,806, filed on Nov. 13, 2015.

(30) Foreign Application Priority Data

Jul. 13, 2016    (TW) .............................. 105122007 A

(51) Int. Cl.
  *G11C 5/14*        (2006.01)
  *G06F 11/14*      (2006.01)
  *G06F 3/06*        (2006.01)

(52) U.S. Cl.
  CPC .......... *G06F 11/1469* (2013.01); *G06F 3/065* (2013.01); *G06F 3/0619* (2013.01); *G06F 3/0679* (2013.01); *G06F 2201/84* (2013.01)

(58) Field of Classification Search
  CPC ..... G11C 11/5628; G11C 16/10; G11C 16/30; G11C 2211/5641; G11C 2211/5643
  See application file for complete search history.

(56) References Cited

U.S. PATENT DOCUMENTS

| 7,388,780 B2* | 6/2008 | Arita ................... G11C 11/5628 |
| | | 365/185.03 |
| 8,644,099 B2* | 2/2014 | Cometti ................. G11C 16/10 |
| | | 365/185.18 |
| 8,738,847 B2 | 5/2014 | Yeh |
| 9,164,887 B2 | 10/2015 | Chiueh et al. |
| 2011/0149650 A1* | 6/2011 | Huang ................ G06F 12/0246 |
| | | 365/185.03 |
| 2011/0231621 A1 | 9/2011 | Liang |
| 2012/0163112 A1* | 6/2012 | Shibata .................. G11C 5/147 |
| | | 365/226 |

(Continued)

FOREIGN PATENT DOCUMENTS

| TW | 201133240 | 10/2011 |
| TW | I362667 | 4/2012 |

(Continued)

*Primary Examiner* — Tuan T Nguyen
(74) *Attorney, Agent, or Firm* — McClure, Qualey & Rodack, LLP

(57) ABSTRACT

A data storage device is provided. The data storage device includes a flash memory and a controller. The flash memory includes a plurality of blocks. Each block includes a plurality of pages. when the data storage device is resumed from a power-off event, the controller selects a first block which was written last before the power-off event among the plurality of blocks and writes data of a plurality of first pages of the first block into a plurality of second pages of the first block.

18 Claims, 7 Drawing Sheets

(56) References Cited

U.S. PATENT DOCUMENTS

| | | | |
|---|---|---|---|
| 2012/0268991 A1* | 10/2012 | Chiao | G11C 16/349 365/185.11 |
| 2015/0138899 A1* | 5/2015 | Shin | G11C 7/00 365/189.011 |
| 2015/0262674 A1 | 9/2015 | Shirakawa | |

FOREIGN PATENT DOCUMENTS

| | | |
|---|---|---|
| TW | 201312351 | 3/2013 |
| TW | 201324154 | 6/2013 |
| TW | 201525998 | 7/2015 |

* cited by examiner

| | LSB | MSB | |
|---|---|---|---|
| WL0, Or_P0 | P0 | P2 | |
| WL1, Or_P1 | P1 | P4 | |
| WL2, Or_P2 | P3 | P6 | |
| WL3, Or_P3 | P5 | P8 | |
| WL4, Or_P4 | P7 | P10 | |
| WL5, Or_P5 | P9 | P12 | |
| ..... | ..... | ..... | B1 |
| WLM, Or_PM | PN-1 | PN | |

FIG. 2

DATA STORAGE DEVICES AND DATA MAINTENANCE METHODS

CROSS REFERENCE TO RELATED APPLICATIONS

This application claims the benefit of U.S. Provisional Application No. 62/254,806, filed on Nov. 13, 2015, the entirety of which is incorporated by reference herein.

This Application claims priority of Taiwan Patent Application No. 105122007, filed on Jul. 13, 2016, the entirety of which is incorporated by reference herein.

BACKGROUND OF THE INVENTION

Field of the Invention

The invention relates to a data storage device, and, more particularly, to a data storage device which is capable of maintaining data after a power-off event occurs.

Description of the Related Art

Flash memories are common non-volatile data storage devices, which can be erased and programmed electrically. For example, NAND flash memories are usually used as memory cards, USB flash devices, solid state disks (SSDs), embedded multi 5 media cards (eMMCs), etc.

Flash memory such as NAND Flash uses a multiple-block structure to store data, wherein the flash memory uses floating gate transistors. The floating gates of the floating gate transistor may catch electronic charges for storing data. However, during the programming process, when a power-off event occurs, the data on the page which is being programmed will be damaged. Thus, how to maintain data after a power-off event occurs is an important issue.

BRIEF SUMMARY OF THE INVENTION

A data storage device and data maintenance method provided by the invention can rewrite the data which may be damaged after a power-off event into the same block.

An exemplary embodiment of a data storage device is provided. The data storage device comprises a flash memory and a controller. The flash memory comprises a plurality of blocks. Each block comprises a plurality of pages. when the data storage device is resumed from a power-off event, the controller selects a first block which was written last before the power-off event among the plurality of blocks and writes data of a plurality of first pages of the first block into a plurality of second pages of the first block.

In an embodiment, the first block further comprises a plurality of word lines. The first block is a multi-level cell (MLC) block. Each word line of the first block is used to control two of the pages of the first block. When the data storage device is resumed from the power-off event, the controller selects the page which was written last before the power-off event among the pages of the first block to serve as a base page and determines the first pages according to a first word line which is used to control the base page among the word lines. The first pages are the pages which have valid data among a plurality of third pages, and the third pages are controlled by the first word line and at least one second word line arranged antecedently to the first word line. In another embodiment, the controller further writes dummy data into the pages which do not have any valid data among the third pages.

In another embodiment, the controller further determines whether there are backups of the first pages in a backup block and writes the data of the first pages which do not have any backups in the backup block into the backup block. Moreover, according to the data which is stored in the backup block and corresponds to the first pages, the controller further performs a writing operation on the second pages to write the data of the first pages into the second pages. The data protection capability of the backup block is higher than that of the first block. In an embodiment, the first block is a multi-level cell (MLC) block, and the backup block is a single-level cell (SLC) block.

An exemplary embodiment of a data maintenance method for a data storage device with a flash memory is provided. The data storage device comprises a plurality of blocks. Each block comprises a plurality of pages. The data maintenance method comprises the steps of, when the data storage device is resumed from a power-off event, selecting a first block which was written last before the power-off event among the plurality of blocks; and writing data of a plurality of first pages of the first block into a plurality of second pages of the first block.

In an embodiment, the first block further comprises a plurality of word lines, the first block is a multi-level cell (MLC) block, and each word line of the first block is used to control two of the pages of the first block. The data maintenance method further comprises the steps of selecting the page which was written last before the power-off event among the pages of the first block to serve as a base page; and determining the first pages according to a first word line which is used to control the base page among the word lines. The first pages are the pages which have valid data among a plurality of third pages, and the third pages are controlled by the first word line and at least one second word line arranged antecedently to the first word line. The data maintenance method further comprises the step of writing dummy data into the pages which do not have any valid data among the third pages.

In another embodiment, the data maintenance method further comprises the steps of determining whether there are backups of the first pages in a backup block; and writing the data of the first pages which do not have any backups in the backup block into the backup block. The above step of writing data of the first pages of the first block into the second pages of the first block comprises the step of, according to the data which is stored in the backup block and corresponds to the first pages, performing a writing operation on the second pages to write the data of the first pages into the second pages. The data protection capability of the backup block is higher than that of the first block. In an embodiment, the first block is a multi-level cell (MLC) block, and the backup block is a single-level cell (SLC) block.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2 is a schematic diagram illustrating a structure of a block according to one exemplary embodiment;

DETAILED DESCRIPTION OF THE INVENTION

The following description is of the contemplated mode of carrying out the invention. This description is made for the purpose of illustrating the general principles of the invention and should not be taken in a limiting sense. The scope of the invention is best determined by reference to the appended claims.

Figure 1:
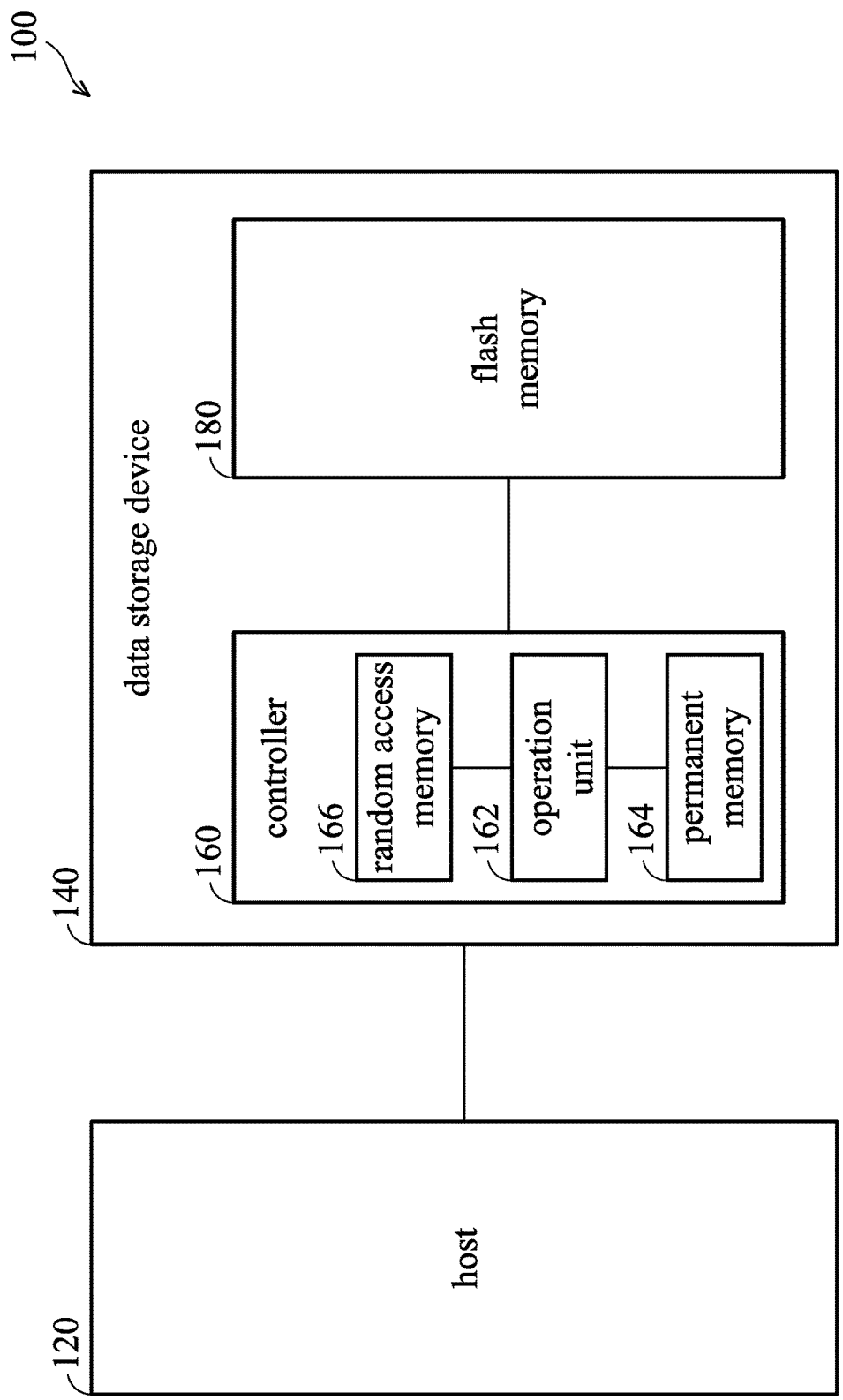
FIG. 1 shows one exemplary embodiment of an electronic system.

FIG. 1 shows an exemplary embodiment of an electronic system. The electronic system 100 comprises a host 120 and a data storage device 140. The data storage device 140 comprises a flash memory 180 and a controller 160 and operates according to the commands issued by the host 120. The controller 160 comprises an operation unit 162, a permanent memory (such as a read only memory (ROM)) 164, and a random access memory (RAM) 166. The permanent memory 164 and the codes and data carried on the permanent memory 162 form firmware which is performed by the operation unit 162, so that the controller 160 can control the flash memory 180 according to the firmware. The random access memory (RAM) 166 loads codes and parameters, and the controller 160 operates according the loaded codes and parameters.

The flash memory 180 comprises a plurality of blocks, and each block comprises a plurality of pages. Specifically, a block acts as the smallest unit for the erasing operation of the flash memory 180, and one page acts as the smallest unit for the writing operation of the flash memory 180. Moreover, the flash memory 180 further comprises a plurality of adjacent word lines and a plurality of adjacent bit lines. Each word line is used to control at least one page for selecting the page to be read. For example, when the blocks of the flash memory 180 are single-level cells (SLCs), one word line controls one page. When the blocks of the flash memory 180 are multi-level cells (MLCs), one word line controls one strong page LSB and one weak page MSB. When the blocks of the flash memory 180 are triple-level cells (TLCs), one word line controls one strong page LSB, one middle page CSB, and one weak page MSB, however, the disclosure is not limited thereto. In details, when the blocks of the flash memory 180 are multi-level cells, one page which is in one block and is controlled one word line can be programmed to be one strong page and one weak page. When the blocks of the flash memory 180 are triple-level cells, one page which is in one block and controlled one word line can be programmed to be one strong page LSB, one middle page CSB, and one weak page MSB.

When the controller 160 performs a writing operation on the flash memory 180 again after the data storage device 140 suffered a power-off event, the controller 160 checks whether a specific page which was being written during the power-off event is broken. In some conditions, even though the controller 160 can successfully read the data from the specific page, the data in the specific page has become unstable due to the attack that is caused by the power-off event. In other words, after a while, when the controller 160 performs a reading operation on the specific page again, the data in the specific page may not be read out successfully. Note that, in the invention, the data whose error bits can be repaired by applying an error correction or repeated read are the data which can be read successfully. Thus, in some embodiments, after the controller 106 is resumed from the power-off state, the controller 160 will write the data in the specific page which was read successfully into another block for ensuring the stability of the data. However, the above manner would consume more blocks and increase the erasing times to the blocks.

Thus, the invention provides an exemplary embodiment for overcoming the above problems. In the embodiment, when the data storage device 140 is resumed from a power-off event, the controller 160 selects a first block which was written last before the power-off event and writes data of a plurality of first pages of the first block into a plurality of second pages of the first block. As described above, the controller 160 writes the data of the first pages into the second pages in the same first block, thereby decreasing the consumption of the blocks.

Note that, in an embodiment, the flash memory 180 comprises a backup block. The data protection capability of the backup block is higher than that of the first block B1. When the controller 160 performs the writing operation on the flash memory 180, the controller 180 writes data into the backup block first and then writes the data into a block. Thus, in the embodiment, before the controller 106 writes the data of the first pages into the second pages, the controller 160 determines whether there are backups of the first pages in the backup block and writes the data of the first pages which do not have any backups in the backup block into the backup block. Then, the controller 160 performs the writing operation on the second pages to write the data of the first pages into the second pages according to the data which is stored in the backup block and corresponds to the first pages. As described above, through writing data into the backup block, the controller 160 protects the data and prevents the data from being damaged by another power-off event.

In an embodiment, most of the blocks of the flash memory (such as the first block) are MLC blocks, and the flash memory 180 comprises a backup block which operates as an SLC block. The data protection capability of the SLC block is higher than that of the MLC block, however, without limitation for the invention. In other embodiments, the first block is a TLC block, the backup block is an SLC block or MLC block, and there is more than one backup block. In the embodiment, in order to find unstable first pages, the controller 160 selects the page which was written last before the power-off event among the pages of the first block B1 to serve as a base block and determines first pages according to a first word line which is used to control the base page among word lines. In details, the first pages are pages having valid data among a plurality of third pages, wherein the third pages are controlled by the first word line and at least one second word line arranged antecedently to the first word line. In another embodiment, the controller 160 further writes dummy data into the pages which do not have valid data among the third pages to stabilize the first block. The dummy data may be a predetermined invalid data or random data without significance.

In details, as shown in FIG. 2, the block B1 comprises original pages Oe_P0~Or_PM, and the original pages Oe_P0~Or_PM are controlled by respective word lines WL0~WLM. In the embodiment, the block B1 is a TLC block. Thus, the controller 160 programs each of the original pages Oe_P0~Or_PM to one strong page LSB and one weak page MSB. The capacity of the original page which is programmed to two pages (one strong page LSB and one weak page MSB) is twice as large as the capacity of the original page which operates as an SLC block. Note that, in an embodiment, based on the characteristics of the flash memory, the controller 160 programs the original pages Oe_P0~Or_PM in a predetermined order to form pages P0~PN. The predetermined order is: programming the strong page LSB of the original page Or_P0 to form the page P0 first, then programming the strong page LSB of the original page Or_P1 to form the page P1, then programming the weak page MSB of the original page Or_P0 to form the page P2, programming the strong page LSB of the original page Or_P2 to form the page P3, then programming the weak page MSB of the original page Or_P1 to form the page P4, and the rest can be done in the same manner. Thus, for the controller 106, the arrangement of the pages P0~PN of the block B1 is shown in FIG. 2. Note that the number of pages P0~Pn is twice the number of original pages Or_P0~Or_PM.

Figure 3:
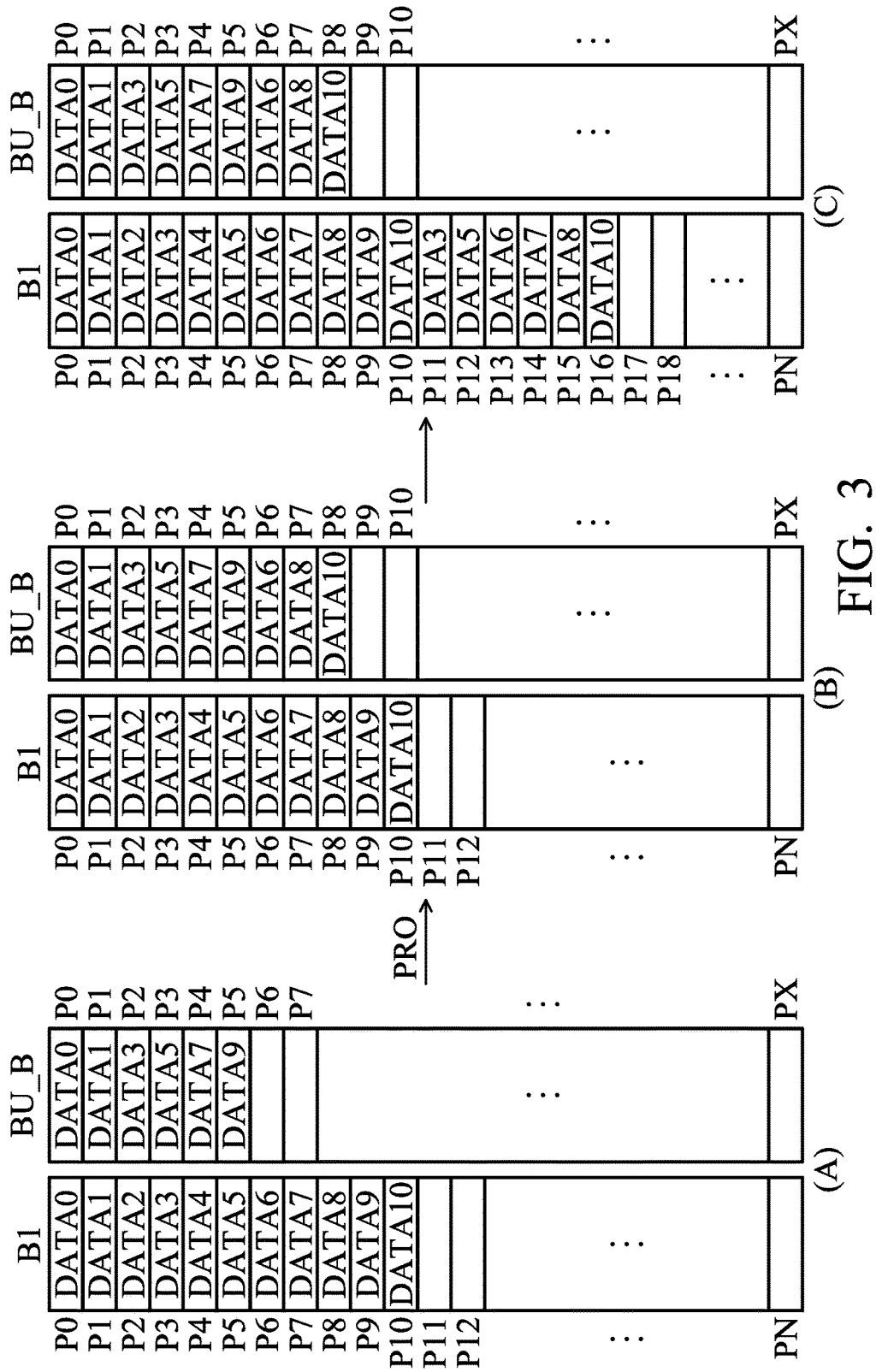
FIG. 3 is a schematic diagram illustrating data movement according to one exemplary embodiment.

FIG. 3 is a schematic diagram illustrating data movement according to one exemplary embodiment. Before a power-off event occurs, the controller 160 sequentially writes data DATA0~DATA10 into the respective pages P0~P10 of a block B0. The block B0 is an MLC block as shown in FIG. 2. In order to prevent a strong page LSB controlled by the same word line from being damaged during the writing operation for a weak page MSB in the block B1, the controller 160 will write the data for the strong page LSB into the backup page first and then write the data into the strong page LSB. Thus, the pages P0~P5 in the backup pages BU_B respectively have the data DATA0, the data DATA1, the data DATA3, the data DATA5, the data DATA7, and the data DATA9, as shown in the portion (A) of FIG. 3. When the controller 160 is writing the data DATA10 into the page P10 of the block B1, a power-off event POR occurs. Then, when the data storage device 140 is resumed from the power-off event, the controller 160 selects the block B1 which was written last before the power-off event among the blocks of the flash memory to serve as a first block. The controller 160 then selects the page P10 which was written last before the power-off event among the pages P0~PN of the block B1 to serve as a base page and further selects the word line WL4 which is coupled to control the base page P10 among the word lines WL0~WLM to serve as a first word line. The controller 160 further selects the pages having valid data among the pages P3, P5~P8, and P10 controlled by the first word line WL4 and the two word lines WL2 and WL3 (referred to as second word lines) arranged antecedently to the first word line to serve as first pages. As described above, the first pages are the pages P3, P5~P8, and P10. Then, the controller 160 determines whether there are backups of the first pages P3, P5~P8, and P10 in the backup block BU_B. In the embodiment, there are only the data DATA3 of the first page P3, the data DATA5 of the first page P5, and the data DATA7 of the first page P7 in the backup block BU_B, while there is not the data DATA6 of the first page P6, the data DATA8 of the first page P8, and the data DATA10 of the first page P10 in the backup block BU_B. Thus, the controller 160 then writes the data DATA6 of the first page P6, the data DATA8 of the first page P8, and the data DATA10 of the first page P10 into the pages P6~P8 in the backup block BU_B, as shown in the portion (B) of FIG. 3. Since all of the pages P3, P5~P8, and P10 controlled by the first word line WL4 and the second word lines WL2 and WL3 have valid data, the controller 160 does not need to write the dummy data into the block B1. Then, according to the data DATA3, DATA5~DATA8, and DATA10 which is stored in the backup block BU_B and corresponds to the first pages P3, P5~P8, and P10, the controller 160 writes the data DATA3, DATA5~DATA8, and DATA10 of the first pages P3, P5~P8, and P10 into the second pages P11~P16 of the first block B1, as shown in the portion (C) of FIG. 3.

Figure 4:
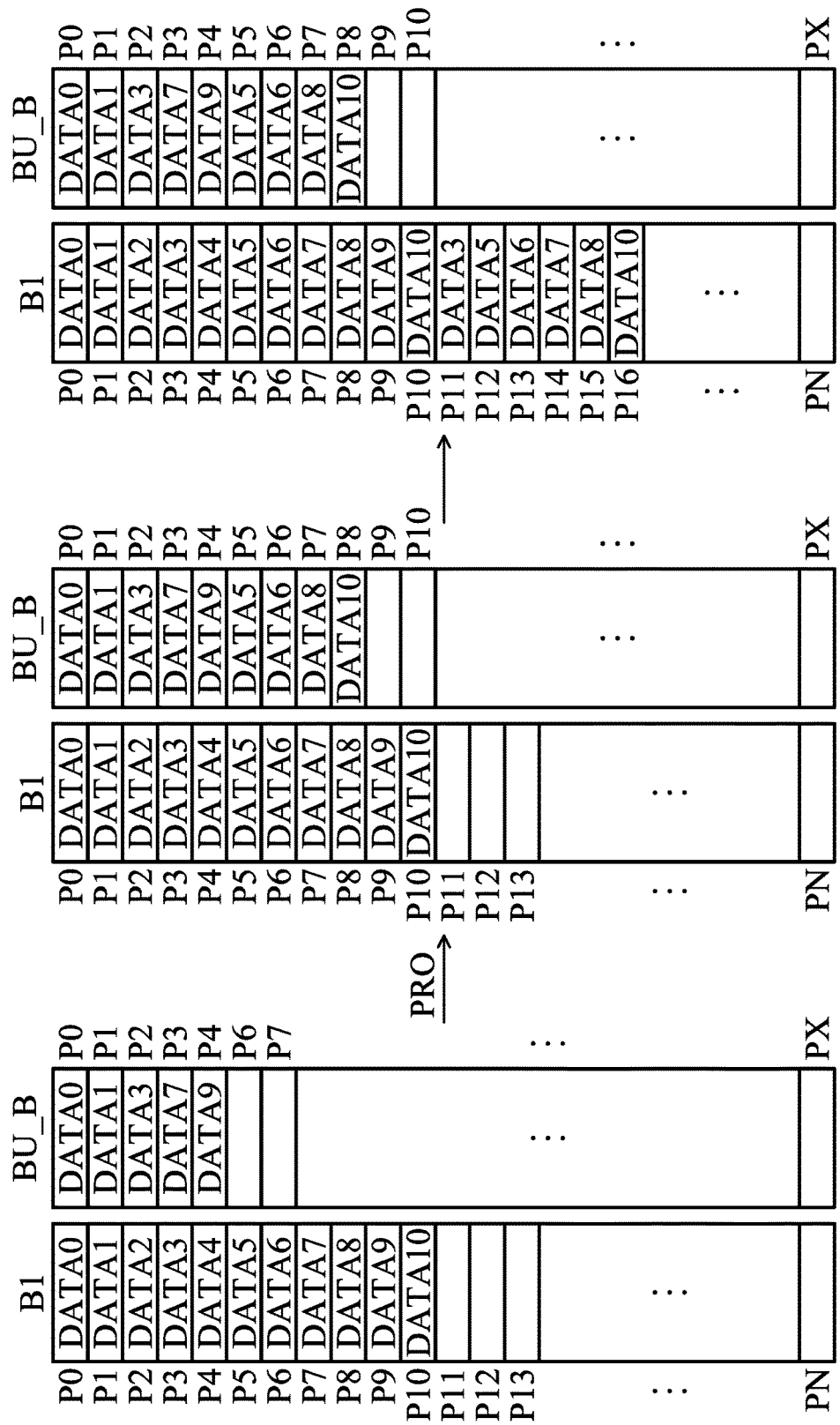
FIG. 4 is a schematic diagram illustrating data movement according to another exemplary embodiment.

FIG. 4 is a schematic diagram illustrating data movement according to another exemplary embodiment. Before a power-off event occurs, the controller 160 sequentially writes data DATA0~DATA10 into the respective pages P0~P10 of a block B0. The block B0 is an MLC block as shown in FIG. 2. In order to prevent a strong page LSB controlled by the same word line from being damaged during the writing operation for a weak page MSB of the block B1, the controller 160 will write the data for the strong page LSB into the backup page first and then write the data into the strong page LSB. Due to the specific rule of the writing operation, the data of some of the strong pages is not written into the backup block BU_B. Thus, in the embodiment, the pages P0~P4 in the backup pages BU_B respectively have the data DATA0, the data DATA1, the data DATA3, the data DATA7, and the data DATA9, as shown in the portion (A) of FIG. 4. When the controller 160 is writing the data DATA10 into the page P10 of the block B1, a power-off event POR occurs. Then, when the data storage device 140 is resumed from the power-off event, according to the above rule, the controller 160 selects pages P3, P5~P8, and P10 to serve as first pages. The controller 160 determines whether there are backups of the first pages P3, P5~P8, and P10 in the backup block BU_B. In the embodiment, there are only the data DATA3 of the first page P3 and the data DATA7 of the first page P7 in the backup block BU_B, while there is not the data DATA5 of the first page P5, the data DATA6 of the first page P6, the data DATA8 of the first page P8, and the data DATA10 of the first page P10 in the backup block BU_B. Thus, the controller 160 then writes the data DATA5 of the first page P5, the data DATA6 of the first page P6, the data DATA8 of the first page P8, and the data DATA10 of the first page P10 into the pages P5~P8 in the backup block BU_B, as shown in the portion (B) of FIG. 4. Since all of the pages P3, P5~P8, and P10 controlled by the first word line WL4 and the second word lines WL2 and WL3 have valid data, the controller 160 does not need to write the dummy data into the block B1. Then, according to the data DATA3, DATA5~DATA8, and DATA10 which is stored in the backup block BU_B and correspond to the first pages P3, P5~P8, and P10, the controller 160 writes the data DATA3, DATA5~DATA8, and DATA10 of the first pages P3, P5~P8, and P10 into the second pages P11~P16 of the first block B1, as shown in the portion (C) of FIG. 4.

Figure 5:
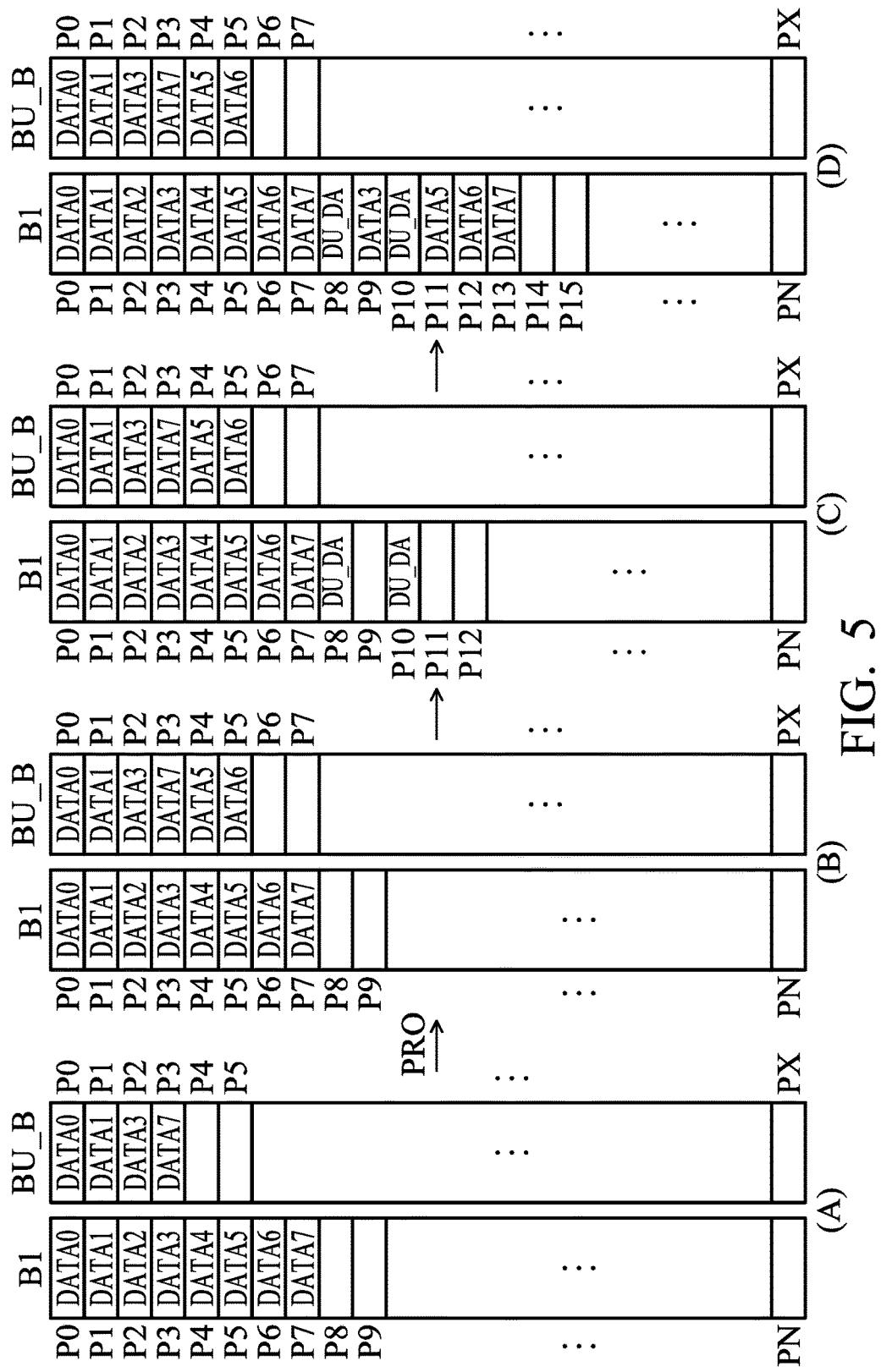
FIG. 5 is a schematic diagram illustrating data movement according to another exemplary embodiment.

FIG. 5 is a schematic diagram illustrating data movement according to another exemplary embodiment. Before a power-off event occurs, the controller 160 sequentially writes data DATA0~DATA7 into the respective pages P0~P7 of a block B0. The block B0 is an MLC block as shown in FIG. 2. In order to prevent a strong page LSB controlled by the same word line from being damaged during the writing operation for a weak page MSB of the block B1, the controller 160 will write the data for the strong page LSB into the backup page first and then write the data into the strong page LSB. However, due to the specific rule of the writing operation, the data of some of the strong pages is not written into the backup block BU_B, for example the data DATA5 of the page P5. In the embodiment, the pages P0~P3 in the backup pages BU_B respectively have the data DATA0, the data DATA1, the data DATA3, and the data DATA7, as shown in the portion (A) of FIG. 5. When the controller 160 is writing the data DATA7 into the page P7 of the block B1, a power-off event POR occurs. Then, when the data storage device 140 is resumed from the power-off event, the controller 160 selects the block B1 which was written last before the power-off event among the blocks of the flash memory to serve as a first block. The controller 160 then selects the page P7 which was written last before the power-off event among the pages P0~PN of the block B1 to serve as a base page and further selects the word line WL4 which is coupled to control the base page P7 among the word lines WL0~WLM to serve as a first word line. The controller 160 further selects the pages having valid data among the pages P3, P5~P7, and P10 controlled by the first word line WL4 and the two word lines WL2 and WL3 (referred to as second word lines) arranged antecedently to the first word line to serve as first pages. In the embodiment, among the pages P3, P5~P8, and P10, only the pages P3 and P5~P7 have valid data, while the pages P8 and P10 do not have any valid data. As described above, the first pages are the pages P3 and P5~P7. Then, the controller 160 determines whether there are backups of the first pages P3 and P5~P7 in the backup block BU_B. In the embodiment, there are only the data DATA3 of the first page P3 and the data DATA7 of the first page P7 in the backup block BU_B, while there is not the data DATA5 of the first page P5 and DATA6 of the first page P6 in the backup block BU_B. Thus, the controller 160 then writes the DATA5 of the first page P5 and the data DATA6 of the first page P6 into the pages P4 and P5 in the backup block BU_B, as shown in the portion (B) of FIG. 5. Since the pages P8 and P10 do not have any valid data among the pages P3, P5~P8, and P10 controlled by the first word line WL4 and the second word lines WL2 and WL3, the controller 160 writes the dummy data into the pages P8 and P10 of the block B1, thereby preventing valid data from being written into the unstable pages P8 and P10 which were attacked by the power-off event, as shown in the portion (C) of FIG. 5. Then, according to the data DATA3 and DATA5~DATA7 which is stored in the backup block BU_B and corresponds to the first pages P3 and P5~P7, the controller 160 writes the data DATA3 and DATA5~DATA7 of the first pages P3 and P5~P7 into the second pages P9 and P11~P13 of the first block B1, as shown in the portion (D) of FIG. 5.

Figure 6:
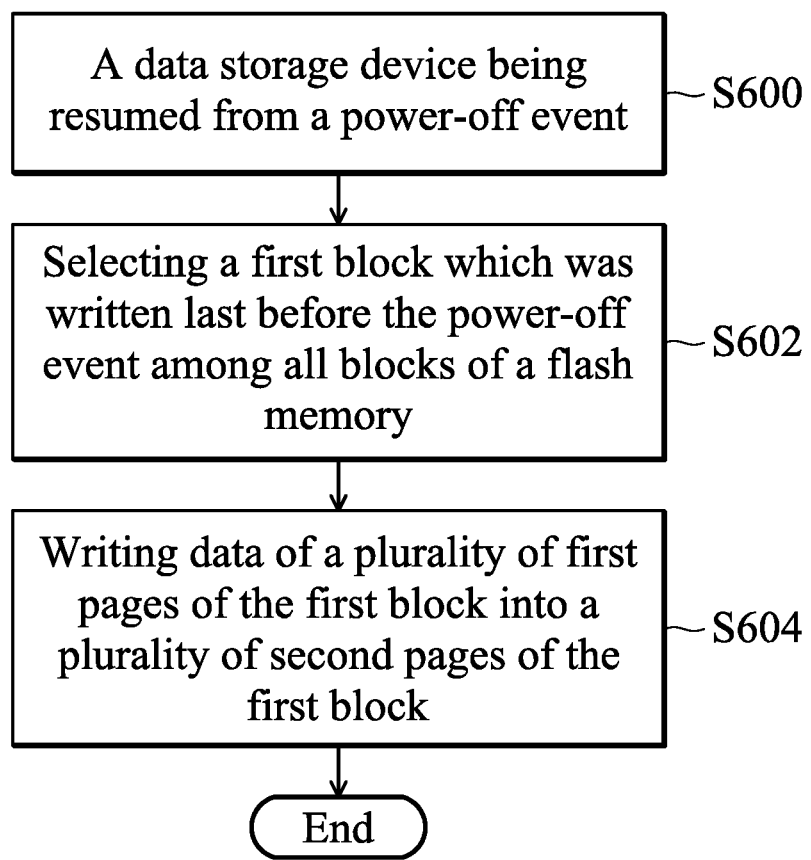
FIG. 6 is a flow chart of one exemplary embodiment of a data maintenance method.

FIG. 6 is a flow chart of one exemplary embodiment of a data maintenance method. The data maintenance method can be applied to the data storage device of FIG. 1. The data maintenance method starts at step S600.

In step S600, the data storage device 140 is resumed from a power-off event. In details, the power-off event can be any event which leads to the data storage device 140 losing its operation voltage and no longer being able to operate.

Then, in step S602, the controller 160 selects a first block which was written last before the power-off event among the blocks of the flash memory 180. In other words, the controller 160 finds the block which was written last before the power-off event among the blocks of the flash memory 180.

In step S604, the controller 160 writes data of a plurality of first pages of the first block into a plurality of second pages of the first block. In other words, in step S604, since the first block is the block which was being written when the power-off event occurred, the controller 160 writes the original valid data (the data of the first pages) of the first block into other pages (the second pages) without any valid data, thereby preventing data from being written into the unstable pages. The data maintenance method ends at step S604. Note that, in other embodiments, step S604 can comprises using a backup block as described in the above embodiment or writing dummy data as described in the above embodiment.

Figure 7:
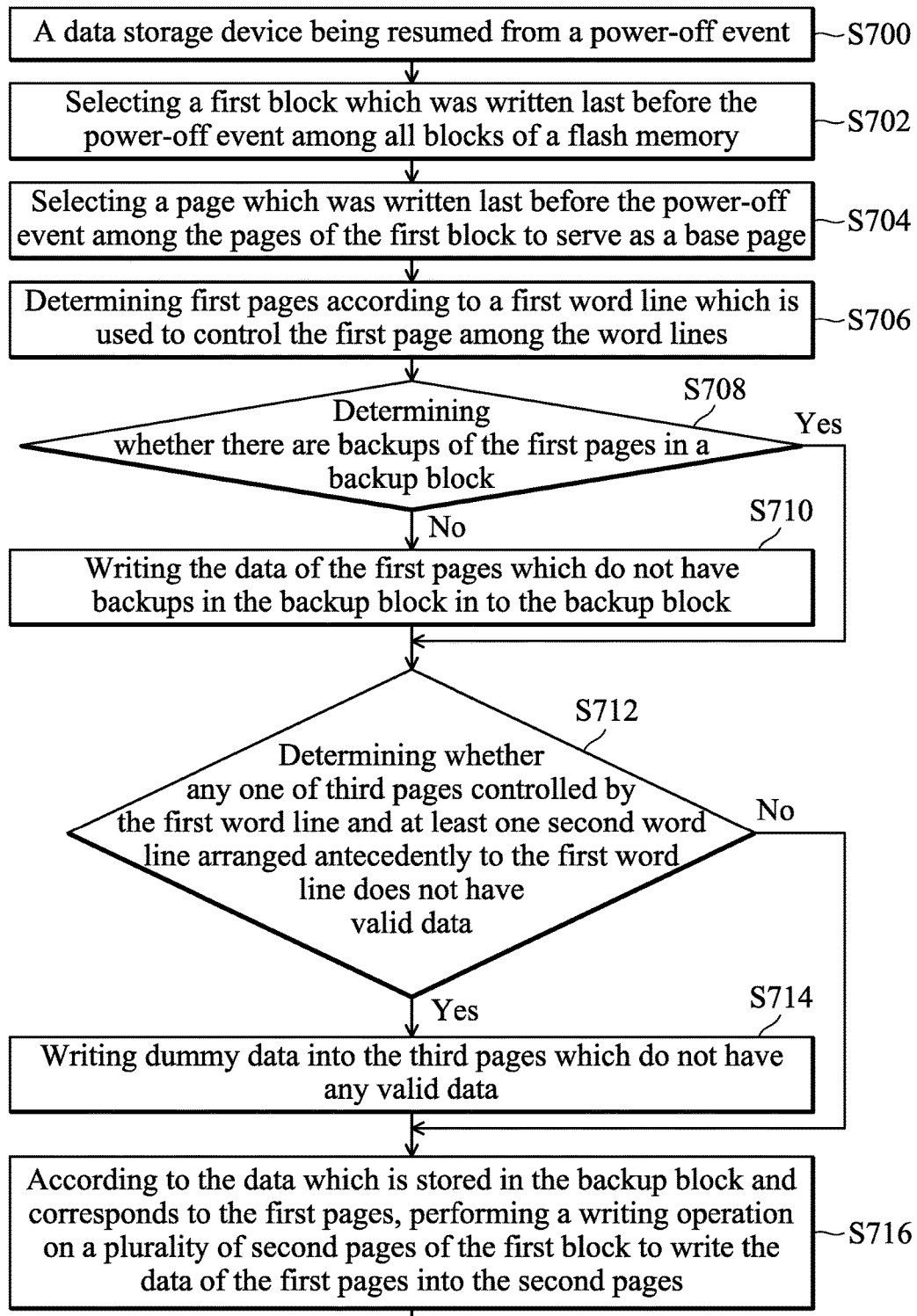
FIG. 7 is a flow chart of another exemplary embodiment of a data maintenance method.

FIG. 7 is a flow chart of another exemplary embodiment of a data maintenance method. The data maintenance method can be applied to the data storage device of FIG. 1. The data maintenance method starts at step S700.

In step S700, the data storage device 140 is resumed from a power-off event. In details, the power-off event can be any event which leads to the data storage device 140 losing its operation voltage and not being able to operate anymore.

Then, in step S702, the controller 160 selects a first block which was written last before the power-off event among the blocks of the flash memory 180. In other words, the controller 160 finds the block which was written last before the power-off event among the blocks of the flash memory 180.

In step S704, the controller 160 then selects the page which was written last before the power-off event among the pages P0~PN of the first block to serve as a base page.

In step S706, the controller 160 determines first pages according to a first word line which is used to control the first page among the word lines. In details, the first pages are pages having valid data among a plurality of third pages, wherein the third pages are controlled by the first word line and at least one second word line arranged antecedently to the first word line. In other words, the controller 160 selects pages having valid data among a plurality of third pages controlled by the first word line and at least one second word line arranged antecedently to the first word line to serve as the first pages.

Then, in step S708, the controller 160 determines whether there are backups of the first pages in a backup block. When there are backups of all of the first pages, the method proceeds to step S712; otherwise, the method proceeds to step S710.

In step S710, the controller 160 writes the data of the first pages which do not have backups in the backup block in to the backup block.

In step S712, the controller 160 determines whether any one of the third pages controlled by the first word line and at least one second word line arranged antecedently to the first word line does not have valid data. When any one of the third pages does not have valid data, the method proceeds to step S714; otherwise, the method proceeds to step S716.

In step S714, the controller 160 writes dummy data into the third pages which do not have any valid data for stabilizing the first block.

In step S716, according to the data which is stored in the backup block and corresponds to the first pages, the controller 160 performs a writing operation on a plurality of second pages of the first block to write the data of the first pages into the second pages. In other words, the controller 160 reads the data of the first pages from the backup block and writes the read data of the first pages into other pages (the second pages) which do not have any valid data originally in the first block. The method ends at step S716.

The data storage device and the data maintenance method provided in the above embodiments can rewrite the data which may be damaged after a power-off event into the same block. In some embodiments, the provided data storage device and the data maintenance method can make valid data more stable by using a backup block and dummy data.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device comprising:
    a flash memory comprising a plurality of blocks, wherein each block comprises a plurality of pages; and
    a controller, when the data storage device is resumed from a power-off event, selecting a first block which was written last before the power-off event among the plurality of blocks and writing data of a plurality of first pages of the first block into a plurality of second pages of the first block.

2. The data storage device as claimed in claim 1, wherein the first block further comprises a plurality of word lines, the first block is a multi-level cell (MLC) block, and each word line of the first block is used to control two of the pages of the first block.

3. The data storage device as claimed in claim 2, wherein when the data storage device is resumed from the power-off event, the controller selects the page which was written last before the power-off event among the pages of the first block to serve as a base page and determines the first pages according to a first word line which is used to control the base page among the word lines.

4. The data storage device as claimed in claim 3, wherein the first pages are the pages which have valid data among a plurality of third pages, and the third pages are controlled by the first word line and at least one second word line arranged antecedently to the first word line.

5. The data storage device as claimed in claim 4, wherein the controller further writes dummy data into the pages which do not have any valid data among the third pages.

6. The data storage device as claimed in claim 1, wherein the controller further determines whether there are backups of the first pages in a backup block and writes the data of the first pages which do not have any backups in the backup block into the backup block.

7. The data storage device as claimed in claim 6, wherein according to the data which is stored in the backup block and corresponds to the first pages, the controller further performs a writing operation on the second pages to write the data of the first pages into the second pages.

8. The data storage device as claimed in claim 6, wherein data protection capability of the backup block is higher than that of the first block.

9. The data storage device as claimed in claim 8, wherein the first block is a multi-level cell (MLC) block, and the backup block is a single-level cell (SLC) block.

10. A data maintenance method for a data storage device with a flash memory, the data storage device comprises a plurality of blocks, and each block comprising a plurality of pages, and the data maintenance method comprises:
    when the data storage device is resumed from a power-off event, selecting a first block which was written last before the power-off event among the plurality of blocks; and
    writing data of a plurality of first pages of the first block into a plurality of second pages of the first block.

11. The data maintenance method as claimed in claim 10, wherein the first block further comprises a plurality of word lines, the first block is a multi-level cell (MLC) block, and each word line of the first block is used to control two of the pages of the first block.

12. The data maintenance method as claimed in claim 11 further comprising:
    selecting the page which was written last before the power-off event among the pages of the first block to serve as a base page; and
    determining the first pages according to a first word line which is used to control the base page among the word lines.

13. The data maintenance method as claimed in claim 12, wherein the first pages are the pages which have valid data among a plurality of third pages, and the third pages are controlled by the first word line and at least one second word line arranged antecedently to the first word line.

14. The data maintenance method as claimed in claim 13 further comprising:
    writing dummy data into the pages which do not have any valid data among the third pages.

15. The data maintenance method as claimed in claim 10 further comprising:
    determining whether there are backups of the first pages in a backup block; and
    writing the data of the first pages which do not have any backups in the backup block into the backup block.

16. The data maintenance method as claimed in claim 15, wherein the step of writing data of the first pages of the first block into the second pages of the first block comprises:
    according to the data which is stored in the backup block and corresponds to the first pages, performing a writing operation on the second pages to write the data of the first pages into the second pages.

17. The data maintenance method as claimed in claim 15, wherein data protection capability of the backup block is higher than that of the first block.

18. The data maintenance method as claimed in claim 17, wherein the first block is a multi-level cell (MLC) block, and the backup block is a single-level cell (SLC) block.

* * * * *